(12) United States Patent
Kim

(10) Patent No.: US 10,118,446 B2
(45) Date of Patent: Nov. 6, 2018

(54) TIRE PRESSURE MONITORING SYSTEM AND METHOD FOR PERFORMING AUTO-LOCATION THEREOF

(71) Applicant: Hyundai Autron Co., Ltd., Seongnam-si (KR)

(72) Inventor: Kyung-Taek Kim, Anyang-si (KR)

(73) Assignee: Hyundai Autron Co., Ltd., Seongnam-si (KR)

(*) Notice: Subject to any disclaimer, the term of this patent is extended or adjusted under 35 U.S.C. 154(b) by 243 days.

(21) Appl. No.: 14/564,085

(22) Filed: Dec. 8, 2014

(65) Prior Publication Data

US 2015/0174971 A1 Jun. 25, 2015

(30) Foreign Application Priority Data

Dec. 20, 2013 (KR) .................. 10-2013-0159975

(51) Int. Cl.
- *B60C 23/00* (2006.01)
- *B60C 23/02* (2006.01)
- *B60C 23/04* (2006.01)

(52) U.S. Cl.
CPC .......... *B60C 23/02* (2013.01); *B60C 23/0416* (2013.01); *B60C 23/0489* (2013.01)

(58) Field of Classification Search
None
See application file for complete search history.

(56) References Cited

U.S. PATENT DOCUMENTS

| 7,076,999 B1 | 7/2006 | Knox |
| 7,269,530 B1 | 9/2007 | Lin et al. |
| 8,332,104 B2 | 12/2012 | Greer et al. |
| 2011/0169627 A1* | 7/2011 | Fink ............... B60C 23/0489 340/442 |
| 2011/0313623 A1* | 12/2011 | Greer ............... G06F 11/30 701/49 |
| 2012/0259507 A1 | 10/2012 | Fink |

FOREIGN PATENT DOCUMENTS

| CN | 102099207 A | 6/2011 |
| CN | 102666147 A | 9/2012 |
| DE | 699 17 997 T2 | 6/2005 |
| DE | 603 01 153 T2 | 6/2006 |
| DE | 10 2008 049 046 A1 | 4/2010 |
| DE | 10 2009 059 788 A1 | 6/2011 |
| JP | 2008-273477 A | 11/2008 |
| KR | 10-2011-0018946 A | 2/2011 |
| KR | 10-2012-0094476 A | 8/2012 |

(Continued)

OTHER PUBLICATIONS

Korean Intellectual Property Office, Office Action for Korean Patent Application No. 10-2013-0159975, dated Jul. 28, 2015.

(Continued)

*Primary Examiner* — Brian Zimmerman
*Assistant Examiner* — Kevin Lau
(74) *Attorney, Agent, or Firm* — Baker McKenzie Hyunho Park

(57) ABSTRACT

Disclosed is a tire pressure monitoring system and a method for performing auto-location thereof that simply identifies the position of a tire pressure monitoring module in a direct scheme tire pressure monitoring system to perform auto-location.

12 Claims, 7 Drawing Sheets

(56) References Cited

FOREIGN PATENT DOCUMENTS

WO        0117805 A1    3/2001
WO   2014/010167 A1    1/2014

OTHER PUBLICATIONS

Deutsches Patent and Management Office, Office Action for German Patent Application No. 10 2014 117 856.4, dated Jan. 15, 2016.
Korea Intellectual Property Office, Office Action for Korean Patent Application No. 10-2013-0159975, dated Jan. 27, 2015.
State Intellectual Property Office of the P.R.C., Office Action for Chinese patent application No. 201410662625.4, dated Jun. 28, 2016, China.

\* cited by examiner

| TRANSMISSION PATTERN NUMBER | PHASE ANGLE NUMBER | | | | |
|---|---|---|---|---|---|
| | FIRST | SECOND | THIRD | FOURTH | FIFTH |
| 0 | 3 | 2 | 4 | 7 | 1 |
| 1 | 0 | 2 | 5 | 1 | 7 |
| 2 | 1 | 5 | 1 | 5 | 1 |
| 3 | 0 | 1 | 3 | 5 | 7 |

FIG. 4

TIRE PRESSURE MONITORING SYSTEM AND METHOD FOR PERFORMING AUTO-LOCATION THEREOF

CROSS-REFERENCE TO RELATED APPLICATIONS

This application claims priority to and the benefit of Korean Patent Application No. 10-2013-0159975 filed in the Korean Intellectual Property Office on Dec. 20, 2013, the entire contents of which are incorporated herein by reference.

TECHNICAL FIELD

The present disclosure relates to a tire pressure monitoring system and a method for performing auto-location thereof, and more particularly, to a tire pressure monitoring system and a method for performing auto-location thereof that that can allocate to respective wheels positions of tire pressure monitoring modules measuring the pressure of tires and transmitting the measured pressure to a control unit.

BACKGROUND ART

In recent years, a tire pressure monitoring system (TPMS) that detects a decrease in air pressure of a tire mounted on a vehicle and notifies the detected decrease to a driver has been mounted on the vehicle.

When the air pressure of the tire is low, the vehicle easily slides to lead to big accident and fuel consumption increases, and as a result, fuel efficiency deteriorates and the life-span of the tire is shortened and a ride comfort and braking power significantly decrease.

The tire pressure monitoring system (TPMS) notifies the decrease in pressure of the tire to the driver to check a pressure state of the tire, thereby preventing the problem from occurring.

The TPMS may be largely classified into a direct scheme and an indirect scheme. The indirect scheme is a method of estimating the tire air pressure from rotational information of the tire and the direct type is a scheme of directly measuring the air pressure of the tire by installing a pressure sensor in a tire wheel.

The direct-scheme TPMS wirelessly receives the tire pressure measured from the tire pressure monitoring module mounted on the wheel or the tire to display the decrease in pressure of the tire.

In this case, it cannot be determined which wheel pressure information of the tire wirelessly received from the tire pressure monitoring module is mounted on at the time of initially mounting, replacing, or changing the position of the wheel or the tire.

SUMMARY OF THE INVENTION

The present disclosure has been made in an effort to provide a tire pressure monitoring system and a method for performing auto-location thereof that simply identifies the position of a tire pressure monitoring module in a direct scheme tire pressure monitoring system to perform auto-location.

An exemplary embodiment of the present disclosure provides a tire pressure monitoring system including: a tire pressure monitoring module provided in a wheel or a tire and measuring pressure of the tire and a wheel phase angle of the wheel, transmitting a burst signal comprises plurality of consecutive data frames including a tire pressure information and an identification code at a predetermined position of phase angle, and setting a delay time between the consecutive data frames of the burst signal based on the predetermined position of phase angle, a wheel monitoring module provided in a vehicle body and measuring rotation of the wheel to provide a phase angle information of the wheel and a control unit receiving the burst signal from the tire pressure monitoring module, receiving the phase angle information of the wheel at the time of transmitting the burst signal from the wheel monitoring module, calculating the predetermined position of phase angle from the delay time, comparing the calculated predetermined position of phase angle and the phase angle information of the wheel with each other to identify the position of the wheel on which the tire pressure monitoring module is mounted.

The control unit may calculate a first phase angle displacement from the burst signal sequentially transmitted from the tire pressure monitoring module, calculate a second phase angle displacement from the phase angle information of each wheel at the time of transmitting the burst signal, identify a wheel in which the first phase angle displacement and the second phase angle displacement sequentially coincide with each other as the wheel on which the tire pressure monitoring module is mounted and assign the identification code transmitted from the tire pressure monitoring module to the wheel.

The tire pressure monitoring module may partition a phase angle of the wheel into a plurality of phase angles to assign phase angle numbers to respective partitioned positions, and calculate and apply the delay time based on the phase angle number assigned to a predetermined position among the respective partitioned positions at the predetermined position.

The tire pressure monitoring module may partition the phase angle of the wheel into the plurality of phase angles to assign the phase angle numbers to the respective partitioned positions, store a plurality of transmission patterns in which the phase angle numbers are arbitrarily arranged, and select a predetermined transmission pattern among the plurality of stored transmission patterns to calculate and apply the delay time based on transmission pattern information representing a position indicated by the phase angle number at the position according to each of the phase angle numbers arranged in the transmission pattern.

The tire pressure monitoring module may calculate a value acquired by adding (the phase angle number×1 ms) to a reference delay time as the delay time.

The tire pressure monitoring module may include a pressure monitoring sensor measuring pressure of the tire, a phase angle sensor measuring a phase angle of the wheel, a pressure monitoring transmission unit wirelessly transmitting the burst signal comprised by consecutive the data frames including a pressure value and an identification code of the tire, and a pressure monitoring control unit setting the delay time between the consecutive data frames based on the predetermined position of phase angle and controlling the pressure monitoring transmission unit so as to transmit the burst signal at the predetermined position of phase angle of the wheel.

The phase angle sensor may be provided as an acceleration sensor.

The wheel monitoring module may be a wheel speed sensor of an anti-lock brake system (ABS).

The control unit may include a tire information processing unit receiving the burst signal from the tire pressure monitoring module and storing the received burst signal, and calculating the predetermined position of phase angle from the delay time between the data frames, a rotational information processing unit receiving the phase angle information of each wheel from the wheel monitoring module and storing and processing the received phase angle information, and a control processing unit comparing the predetermined position of phase angle information calculated by the tire information processing unit and the phase angle information processed by the rotational information processing unit to automatically allocate the position of the tire pressure monitoring module.

Meanwhile, another exemplary embodiment of the present disclosure provides a method for performing auto-location of a tire, including: measuring, by a tire pressure monitoring module provided in a wheel or the tire, pressure of the tire and a wheel phase angle of the wheel, consecutive data frames including tire pressure information and an identification code at a predetermined position of phase angle, however, transmitting a burst signal set based on the predetermined position of phase angle at the delay time between the consecutive data frames by the tire pressure monitoring module, receiving phase angle information at the time of transmitting the burst signal from a wheel monitoring module provided in a vehicle body and measuring rotation of the wheel; and calculating the predetermined position of phase angle from the delay time and comparing the calculated predetermined position of phase angle with the phase angle information to identify the position of the wheel on which the tire pressure monitoring module is mounted.

In the identifying of the position of the wheel on which the tire pressure monitoring module is mounted, calculate a first phase angle displacement from the burst signal sequentially transmitted from the tire pressure monitoring module, calculate a second phase angle displacement from the phase angle information of each wheel at the time of transmitting the burst signal, identify a wheel in which the first phase angle displacement and the second phase angle displacement sequentially coincide with each other as the wheel on which the tire pressure monitoring module is mounted. In the transmitting of the burst signal, the phase angle of the wheel may be partitioned into the plurality of phase angles to assign the phase angle number to the respective partitioned positions, and the delay time may be calculated and applied based on the phase angle number assigned to a predetermined position among the respective partitioned positions at the predetermined position.

In the transmitting of the burst signal, a value acquired by adding (the phase angle number×1 ms) to a reference delay time may be calculated and applied as the delay time.

In the transmitting of the burst, the phase angle of the wheel may be partitioned into the plurality of phase angles to assign the phase angle number to the respective partitioned positions, a plurality of transmission patterns may be stored, in which the phase angle numbers are arbitrarily arranged, and a predetermined transmission pattern may be selected among the plurality of stored transmission patterns to calculate and apply the delay time based on transmission pattern information representing a position indicated by the phase angle number at the position according to each of the phase angle numbers arranged in the transmission pattern.

According to exemplary embodiments of the present disclosure, a tire pressure monitoring system and a method for performing auto-location thereof simply identify the position of a tire pressure monitoring module in a direct-scheme tire monitoring system to perform auto-location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a diagram illustrating a plurality of transmission patterns.

Figure 1:
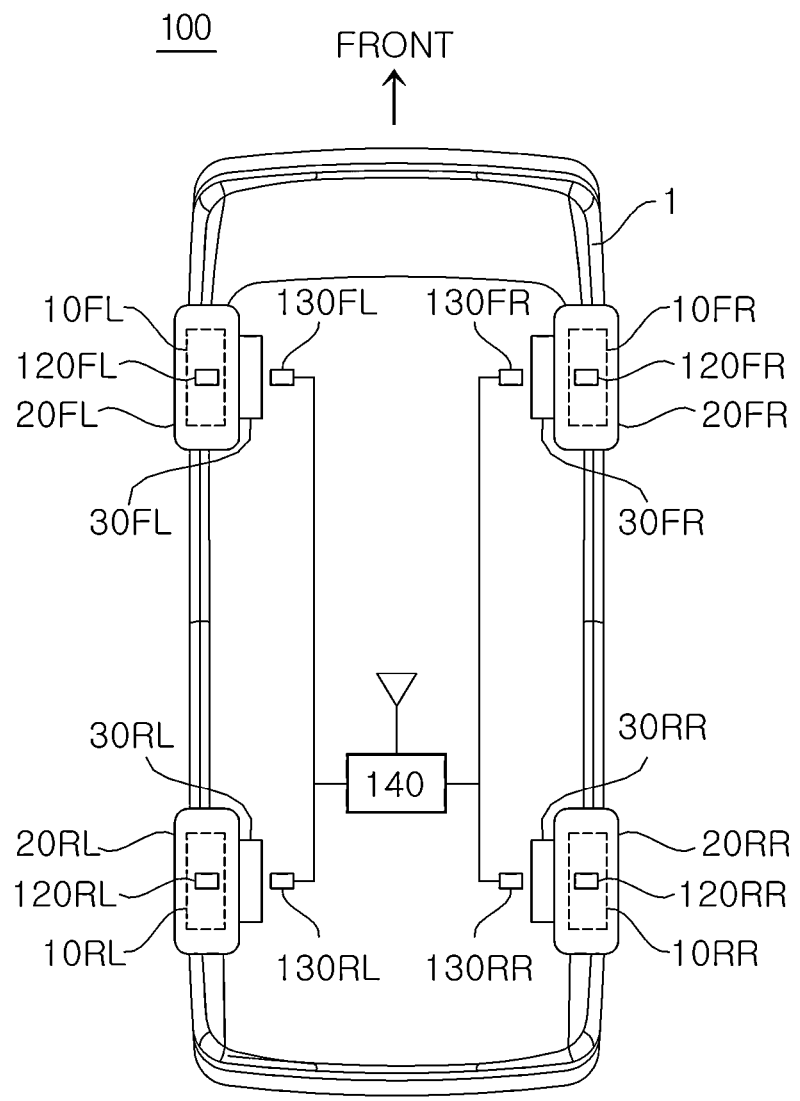
FIG. 1 is a diagram illustrating a tire pressure monitoring system according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be identified in part by the particular intended application and use environment.

In the figures, reference numbers refer to the same or equivalent parts of the present disclosure throughout the several figures of the drawing.

DETAILED DESCRIPTION

Hereinafter, the exemplary embodiments of the present disclosure will be described in detail with reference to the accompanying drawings in order to clarify a method of solving the technical problems of the present disclosure. However, when a description of the related art still obscures the spirit of the present disclosure in describing the present disclosure, a description thereof will be omitted. The terms used in the following description are defined considering the functions of the present disclosure and may vary depending on the intention or usual practice of a designer or manufacturer. Therefore, the definitions should be made based on the entire contents of the present specification. Parts indicated by like reference numerals refer to like elements throughout the specification.

FIG. 1 is a diagram illustrating a tire pressure monitoring system according to an exemplary embodiment of the present disclosure.

Referring to FIG. 1, the tire pressure monitoring system 100 according to the exemplary embodiment of the present disclosure includes a tire pressure monitoring module 120, a wheel monitoring module 130, and a control unit 140.

A plurality of wheels 10 of a vehicle is provided. In the exemplary embodiment, the wheel 10 includes a right front wheel 10FR, a left front wheel 10FL, a right rear wheel 10RR, and a left rear wheel 10RL. In some embodiments, various numbers of wheels 10 may be provided.

A tire 20 is mounted on the outer circumference of the wheel 10 of the vehicle and is made of a rubber material. The tire 20 is mounted on a rim of the wheel 10. The tire 20 is provided in each wheel 10 and in the exemplary embodiment, the tire 20 includes an FR tire 20 FR provided at a front right side of a vehicle body 1, an FL tire 20 FL provided at a front left side, an RR tire 20RR provided at a rear right side, and an RL tire 20RL provided at a rear left side to correspond to the wheels 10.

The tire pressure monitoring module 120 is provided in the wheel 10 or the tire 20 to sense the pressure and/or the temperature of the tire 20 for determining a level of air pressure of the tire 20 and senses a phase angle of the wheel 10.

The tire pressure monitoring module 120 may be installed at various positions of the wheel 10 such as the rim of the wheel 10 or the side of the tire 20. The plurality of tire pressure monitoring modules 120 are provided in the respective wheels 10 to monitor the pressure of each tire 20 and the phase angle of each wheel 10.

The plurality of tire pressure monitoring module 120 have identification codes which are unique numbers distinguished from respective other tire pressure monitoring modules 120.

The plurality of tire pressure monitoring module 120 wirelessly transmits a burst signal acquired by consecutively configuring data frames including respectively monitored pressure values and/or temperature values, identification codes of the tires 20 to the control unit 140.

The tire pressure monitoring module 120 wirelessly transmits the burst signal to the control unit 140 at a predetermine phase angle position of the wheel 10 and sets a delay time between the data frames based on a phase angle at that time. A predetermined phase angle at which the tire pressure monitoring module 120 transmits the burst signal is randomly changed and the tire pressure monitoring module 120 transmits the burst signal acquired by consecutively configuring data frames including tire pressure information and identification codes of the tires at a changed transmission position.

Figure 6:
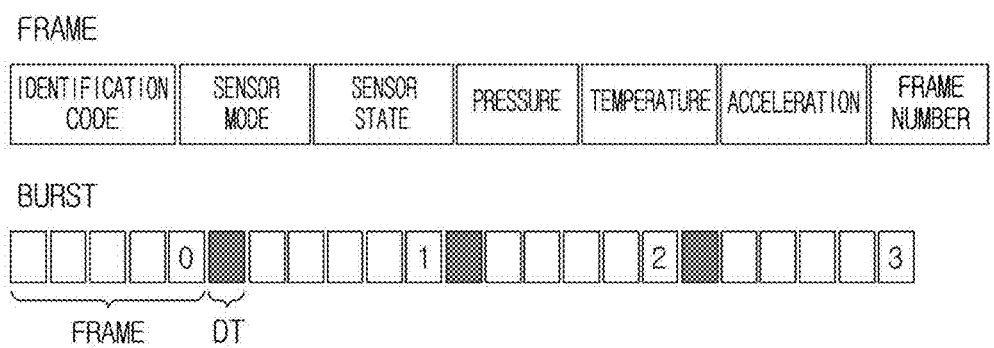
FIG. 6 is a diagram illustrating configurations of a data frame and a burst signal.

Referring to FIG. 6, the data frames are comprised to include the identification codes, a sensor mode, a sensor state, pressure, a temperature, an acceleration, a frame number, and the like and the burst signal is comprised by consecutive data frames. A predetermined delay time (DT) is applied between the consecutive data frames, and the tire pressure monitoring module 120 calculates and applies the delay time (DT) based on the phase angle at the time of transmitting the burst signal.

Figure 2:
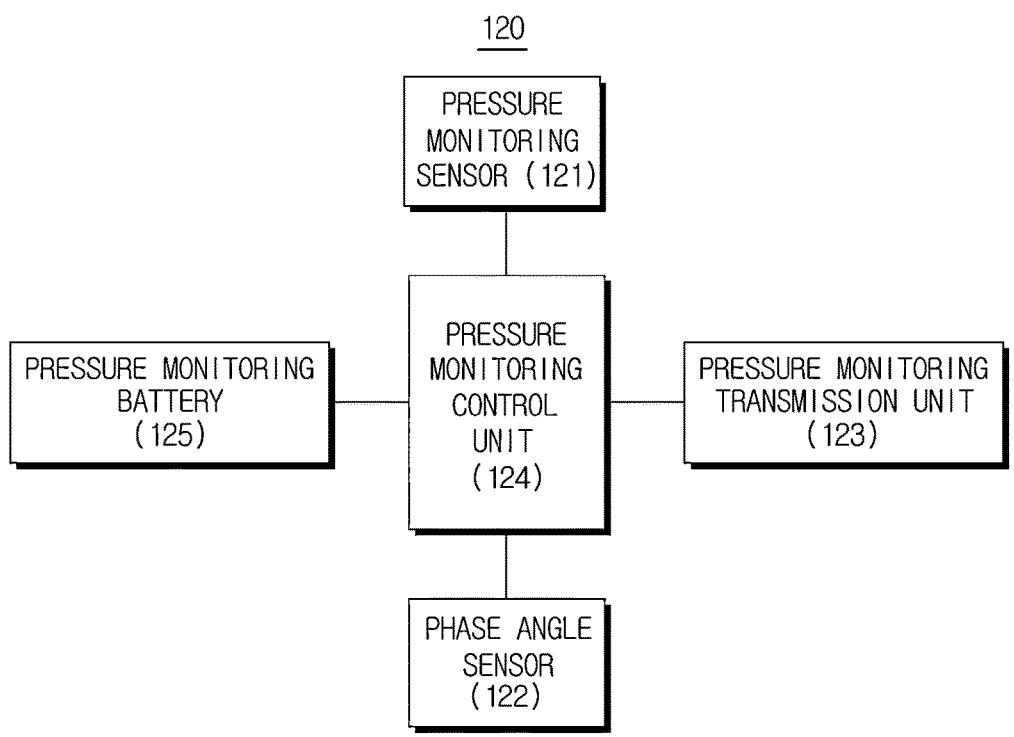
FIG. 2 is a block diagram illustrating a configuration of a tire pressure monitoring module of FIG. 1.

Referring to FIG. 2, the tire pressure monitoring module 120 includes a pressure monitoring sensor 121, a phase angle sensor 122, a pressure monitoring transmission unit 123, a pressure monitoring control unit 124, and a pressure monitoring battery 125 supplying power.

The pressure monitoring sensor 121 measures the pressure and/or temperature of the tire. The pressure value and/or the temperature value of the tire 20 measured by the pressure monitoring sensor 121 are transferred to the pressure monitoring control unit 124 to be converted from an analog signal to a digital signal.

The phase angle sensor 122 measures the phase angle of the wheel 10. The phase angle sensor 122 preferably calculates an accurate phase angle from a reference point when the wheel 10 rotates, but in some embodiments, the phase angle sensor 122 may measure a phase angle variation for a predetermined time when the wheel 10 rotates or output a signal at the time of reaching a predetermined phase angle when the wheel 10 rotates.

The phase angle sensor 122 may output an electrical signal with a change of gravity, output the electrical signal with a change in acceleration, or output the signal when being impacted from the ground.

As the phase angle sensor 122, various sensors including a piezoelectric sensor, an acceleration sensor, and an impact sensor may be used according to a signal output method.

In the embodiment, the phase angle sensor 122 is the acceleration sensor that is installed in a gravity direction to output the electrical signal with the change in gravity. The phase angle sensor 122 outputs a signal of which a value continuously varies similarly to a sine curve with the rotation of the wheel 10.

Figure 3:
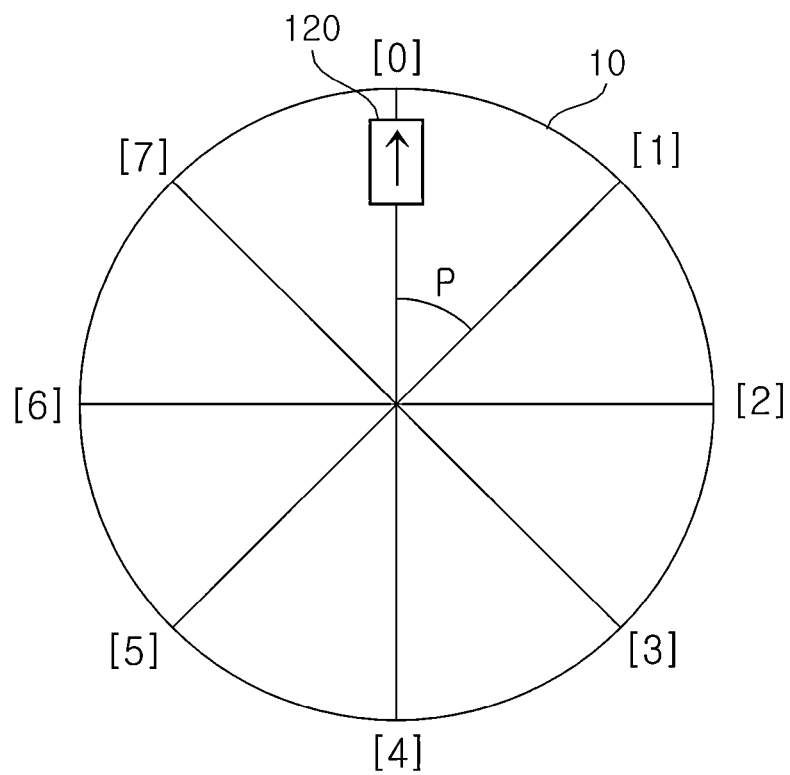
FIG. 3 is a diagram illustrating a transmission position resolution of the tire pressure monitoring module of FIG. 1.

Referring to FIG. 3, the tire pressure monitoring module 120 is provided in a radial direction of the wheel 10 to measure a gravity-direction acceleration. The tire pressure monitoring module 120 measures the radial acceleration of the wheel 10, however, outputs only a gravity—direction acceleration component other than an acceleration component with movement of the vehicle.

When the tire pressure monitoring module 120 is positioned at the highest location of the wheel 10, the gravity becomes maximum, and as a result, the phase angle sensor 122 outputs a minimum value, and when the tire pressure monitoring module 120 is positioned at the lowest location of the wheel 10, the gravity becomes minimum, and as a result, the phase angle sensor 122 outputs a maximum value.

Therefore, when the phase angle sensor 122 outputs a minimum value at the time of rotating the wheel 10, a phase angle P is 0 degree and when the phase angle sensor 122 outputs an intermediate value, the phase angle P is 90 degrees, when the phase angle sensor 122 outputs a maximum value, the phase angle P is 180 degrees, and when the phase angle sensor 122 outputs the intermediate value again, the phase angle P is 270 degrees. The phase angle P may be calculated according to consecutive output values of the phase angle sensor 122.

A signal output by the phase angle sensor 122 is transferred to the pressure monitoring control unit 124 to be converted from the analog signal to the digital signal.

The pressure monitoring transmission unit 123 wirelessly transmits a burst signal comprised by consecutive data frames including pressure values, identification codes, and the like of the tire 20 to the control unit 140. The pressure monitoring transmission unit 123 outputs the burst signal processed by the pressure monitoring control unit 124 as an encoded radio frequency (RF) signal.

The pressure monitoring control unit 124 receives the pressure value and/or the temperature value of the tire 20 sensed from the pressure monitoring sensor 121 and receives information representing the phase angle of the wheel 10 from the phase angle sensor 122 to generate the burst signal comprised by the continuous data frames including the pressure value, the identification code, the frame number, and the like of the tire 20 as illustrated in FIG. 6. The generated burst signal is transmitted to the control unit 140 through the pressure monitoring transmission unit 123.

Referring to FIG. 6, in the pressure monitoring control unit 124, the data frames are comprised to include the identification codes, the sensor mode, the sensor state, the pressure, the temperature, the acceleration, the frame number, and the like and the burst signal is comprised by consecutive the data frames. A predetermined delay time is applied between the consecutive data frames, and the pressure monitoring control unit 124 calculates and applies the delay time based on the phase angle at the time of transmitting the burst signal. For example, the delay time may calculated as a value acquired by adding a predetermined time depending on the phase angle value to a reference delay time which is basically required.

The pressure monitoring control unit 124 controls the pressure monitoring transmission unit 123 so as to transmit the burst signal at a predetermined position of phase angle of the wheel 10.

In detail, the pressure monitoring control unit 124 partitions the phase angle of the wheel 10 into a plurality of angles and assigns phase angle numbers to the respective partitioned positions, transmits the burst signal to the control unit 140 through the pressure monitoring transmission unit 123 at a predetermined position among the respective partitioned positions, and calculates and applies the delay time based on the phase angle number assigned to the position. In the exemplary embodiment, a value acquired by adding (phase angle number×1 ms) to the reference delay time is calculated as the delay time. The position to which the burst signal is transmitted is randomly changed.

Referring to FIG. 3, in the exemplary embodiment, the phase angle of the wheel 10 is equally partitioned to assign phase numbers of 0 to 7 are assigned to the respective partitioned positions. In this case, a difference in phase angle of the wheel 10 among the respective phase angle numbers becomes 45 degrees.

The pressure monitoring control unit 124 generates a predetermined numerical figure among 0 to 7 by using a random variable, calculates the delay time depending on the phase angle number at a position of a phase angle number indicated by the generated numerical figure and generates the applied burst signal, and transmits the burst signal to the control unit 140 through the pressure monitoring transmission unit 123. The phase angle number indicating the position where the burst signal is transmitted is randomly changed.

In this regard, since the position to which the tire pressure monitoring module 120 transmits the burst signal to the control unit 140 is changed every transmission, an error occurrence risk depending on a signal shading area of the tire 20 or the wheel 10 is reduced. Further, since the position where the tire pressure monitoring module 120 transmits the burst signal is represented by the delay time between the data frames in the burst signal, the data frames may be simplified.

Meanwhile, the pressure monitoring control unit 124 may store a plurality of transmission patterns in which a position where the tire information is transmitted is set according to the phase angle of the wheel 10. The plurality of transmission patterns are comprised by arranging the phase angle of the wheel 10 at the position to which the burst signal is transmitted according to a time sequence. In this case, the phase angle of the wheel 10 may represent the value of the phase angle, but one turn of the wheel 10 is partitioned to assign the phase angle numbers which are unique numbers to respective partitioned points.

Transmission pattern numbers which are the unique numbers are set for the plurality of transmission patterns, respectively. The transmission pattern number is assigned for each transmission pattern to be stored in the pressure monitoring control unit 124.

FIG. 4 illustrates an example of a pattern table in which the transmission pattern numbers for the plurality of patterns and the phase angle number of each transmission pattern are assigned. In the exemplary embodiment, 5 phase angle numbers are set for the respective transmission patterns and 4 plural transmission patterns are set. Transmission pattern numbers of 0 to 3 are assigned to 4 transmission patterns.

Phase numbers of [0, 2, 5, 1, 7] are set for a second transmission pattern to which transmission pattern No. 1 is assigned. When the second transmission pattern is calculated by the phase angle of the wheel 10, the second transmission pattern becomes [0 degrees, 90 degrees, 225, degrees, 45, degrees, 315 degrees].

The pressure monitoring control unit 124 arbitrarily selects one transmission pattern of the transmission patterns to generate the burst signal at a position indicated by the phase angle number according to the respective phase angle numbers arranged in the transmission patterns and transmit the generated burst signal to the control unit 140. In this case, the burst signal the delay time is calculated and applied based on transmission pattern information representing the phase angle number in the transmission pattern table. For example, the delay time may be calculated and applied by a value acquired by adding (transmission pattern information× 0.1 ms) to the reference delay time.

The transmission pattern information includes the transmission pattern number of the selected transmission pattern and sequence information which is a sequence of the phase angle numbers at the time of transmitting the tire information in the selected transmission pattern. That is, the transmission pattern information represents a number in which the transmission pattern number and the sequence information of the phase angle number are combined.

Referring to FIG. 4, when the selected transmission pattern is the second transmission pattern and the tire information is transmitted at phase angle No. 5 which is the third phase angle number in the second transmission pattern, the transmission pattern information becomes [13]. When the transmission pattern information is [24], the selected transmission pattern is the third transmission pattern and the phase angle number at the time of transmitting the tire information is 5 which is the fourth phase angle number of the third transmission pattern.

The control unit 140 stores the transmission pattern table showing the same transmission pattern to calculate the phase angle of the wheel 10 from the transmission pattern information transmitted by the pressure monitoring control unit 124 of the tire pressure monitoring module 120.

The pressure monitoring battery 125 supplies power to the pressure monitoring control unit 124, the pressure mentoring sensor 121, the phase angle sensor 122, and the pressure monitoring transmission unit 123.

The wheel monitoring module 130 monitors rotational information (second wheel phase angle information) of the wheel 10 representing a rotational degree of the wheel 10. The wheel monitoring module 130 is provided in the vehicle body 1 to monitor the rotational information of the wheel 10 by various methods.

In the exemplary embodiment, a saw tooth is formed in a disk 30 of the wheel 10 that rotates together with the tire 20 and the wheel monitoring module 130 monitors that the saw tooth of the disk 30 passes to output the monitored state as the rotational information of the wheel 10. The wheel monitoring module 130 provides a signal to monitor that the sawtooh of the disk 30 passes and the wheel monitoring module 130 generates a pulse when the sawtooth passes and the wheel monitoring module 130 passes through a part without the sawtooth.

In the exemplary embodiment, the number of pulses generated by the wheel monitoring module 130 is the rotational information of the wheel 10. As the sensor of the wheel monitoring module 130, various sensors including an optical sensor, an induction sensor, and a hole effect sensor that may sense that the sawtooth passes may be used.

The sawtooth of the disk 30 has a predetermined number. The number of sawteeth may be changed depending on the type of the vehicle or the wheel 10, and as a result, the number of pulses generated by the wheel monitoring module 130 may also be changed when the wheel 10 rotates at one turn. In the exemplary embodiment, 48 sawteeth of the disk 30 may be formed. Accordingly, the wheel monitoring module 130 may generate 96 pulses when the wheel 10 rotates at one turn.

The wheel monitoring module 130 monitors the number of sawteeth that passes from a predetermined time and outputs the pulse number of times. Assumed that the number of pulses generated by the wheel monitoring module 130 when the wheel 10 rotates at one turn is N_pul, N_sh, the number of pulses output by the wheel monitoring module 130 when the wheel 10 rotates at P degrees is given below.

The number of pulses, $N\_sh = N\_pul * (P/360 \text{ degrees})$

For example, the wheel monitoring module 130 may generate 12 pulses when the wheel 10 rotates at 45 degrees.

The wheel monitoring module 130 may be separately provided for the tire pressure monitoring system 100, but in general, the wheel monitoring module 130 is preferably a part of an anti-lock brake system (ABS) of the vehicle. That is, the wheel monitoring module 130 may be a wheel speed sensor of the anti-lock brake system.

A plurality of wheel monitoring modules 130 is provided and in the exemplary embodiment, the wheel monitoring modules 130 are provided in the same as the number of wheels 10 to correspond to the respective wheel 10 to monitor the rotational information in each wheel 10.

The plurality of wheel monitoring modules 130 transfer the rotational information (second wheel phase angle information) of the respective wheel 10 to the control unit 140. The plurality of respective wheel monitoring modules 130 are connected with the control unit 140 via a wired line. The plurality of respective wheel monitoring modules 130 are preferably connected with the control unit 140 via a controller area network (CAN) bus.

The control unit 140 receives the burst signal from the tire pressure monitoring module 120, calculates a phase angle position (first wheel phase angle information) when the tire pressure monitoring module 120 transmits the burst signal from the delay time by receiving second wheel phase angle information at the time of transmitting the burst signal from the wheel monitoring modules 130, and compares the calculated phase angle position and the second wheel phase angle information with each other to identify the position of the wheel on which the tire pressure monitoring module is mounted.

In detail, the control unit 140 calculates a predetermined position of phase angle (first wheel phase angle information) where the respective tire pressure monitoring modules 120 transmits the burst signal from the burst signal sequentially transmitted from the tire pressure monitoring module 120 and calculates a first phase angle displacement therefrom, calculates a second phase angle displacement from the second wheel phase angle information of each wheel 10 when the respective burst signal are transmitted to identify the wheel 10 in which the first phase angle displacement and the second phase angle displacement sequentially coincide with each other as the wheel on which the tire pressure monitoring module 120 is mounted and assign the identification code transmitted from the tire pressure monitoring module 120 to the wheel.

Figure 5:
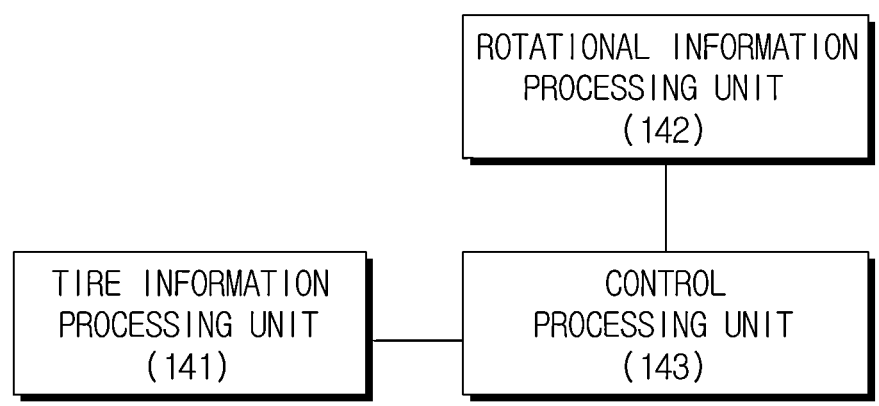
FIG. 5 is a block diagram illustrating a configuration of a control unit of FIG. 1.

FIG. 5 is a block diagram illustrating a configuration of a control unit according to an exemplary embodiment of the present disclosure.

Referring to FIG. 5, the control unit 140 includes a tire information processing unit 141, a rotational information processing unit 142, and a control processing unit 143.

The tire information processing unit 141 stores the burst signal transmitted from the tire pressure monitoring module 120 together with a transmission time. The tire information processing unit 141 calculates the predetermined position of phase angle (first wheel phase angle information) where the tire pressure monitoring module 120 transmits the burst signal from the delay time between the data frames and stores the calculated phase angle position together with the transmission time.

The tire information processing unit 142 receives the rotational information of the respective wheels 10 from the plurality of wheel monitoring modules 130. The rotational information processing unit 142 integrates the rotational information (second wheel phase angle information) of the wheel 10 received from the wheel monitoring module 130 at a predetermined time with time and stores the integrated rotational information.

The control processing unit 143 receives the first wheel phase angle information from the tire information processing unit 141 and receives the second wheel phase angle information of each wheel 10 stored in the rotational information processing unit 142 at the time when the tire pressure monitoring module 120 transmits the burst signal from the rotational information processing unit 142, and compares the first wheel phase angle information and the second wheel phase angle information to identify the position of the tire pressure monitoring module 120.

In this case, since the second wheel phase angle information input in the wheel monitoring module 130 has no reference value, whether the first wheel phase angle information and the second phase angle information coincide with each other is identified by comparing whether the displacements of the phase angles coincide with each other from a plurality of pieces of information.

The control processing unit 143 calculates from the plurality of first wheel phase angle information the first phase angle displacement which is a difference in position where the burst signal is transmitted from the tire pressure monitoring module 120. Further, the second phase angle displacement of each wheel 10 is calculated from the second wheel phase angle information in each wheel 10 at the time of transmitting the respective burst signal. The control processing unit 143 finds a case in which the calculated first phase angle displacement and the second phase angle displacement in each wheel 10 coincide with each other to identify the wheel 10 in which the second phase angle displacement coincides with or substantially coincides with the first phase angle displacement as the wheel 10 on which the tire pressure monitoring module 120 transmitting the burst signal is mounted.

The control processing unit 143 assigns the identification code of the tire pressure monitoring module 120 to the wheel 10 on which the tire pressure monitoring module 120 is mounted and stores the assigned identification code.

As described above, according to the tire pressure monitoring system 100 according to the present disclosure, the direct-scheme tire pressure monitoring system simply identifies the position of the tire pressure monitoring module 120 to automatically allocate the position.

Further, since the position where the tire pressure monitoring module 120 transmits the burst signal to the control unit 140 is changed every transmission, an error occurrence risk depending on a signal shading area of the tire 20 or the wheel 10 is reduced.

Moreover, since the position to which the tire pressure monitoring module 120 transmits the burst signal is represented by the delay time between the data frames in the burst signal, the data frames may be simplified.

Meanwhile, hereinafter, a method for performing auto-location of the tire according to another exemplary embodiment of the present disclosure will be described below with reference to the accompanying drawings. However, the same parts as described in the tire pressure monitoring system 100 according to the exemplary embodiment of the present disclosure will not be described.

Figure 7:
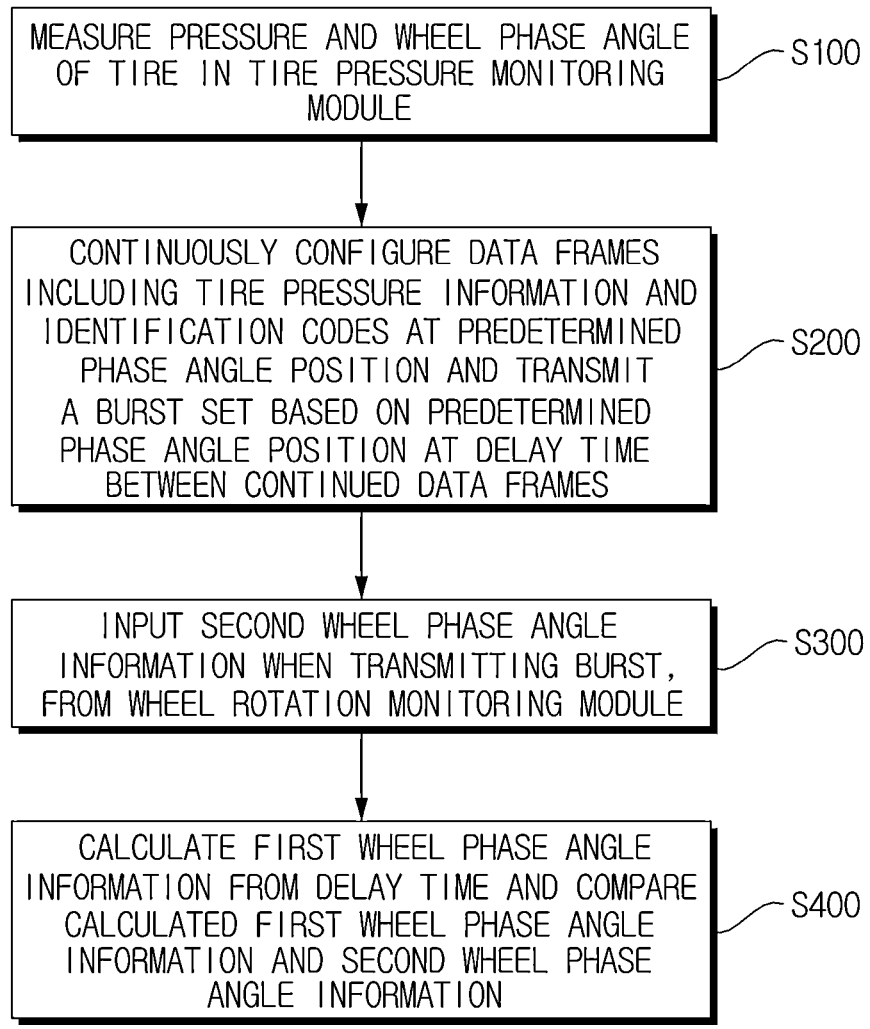
FIG. 7 is a flowchart of a method for performing auto-location of a tire according to another exemplary embodiment of the present disclosure.

FIG. 7 is a flowchart of a method for performing auto-location of a tire according to another exemplary embodiment of the present disclosure.

Referring to FIG. 7, the method for performing auto-location of a tire according to the exemplary embodiment of the present disclosure includes measuring pressure and a wheel phase angle of a tire 20 in a tire pressure monitoring module 120 provided in a wheel 10 or the tire 20 (S100), continuously configuring, by the tire pressure monitoring module 120, data frames including tire pressure information and identification codes and transmitting a burst signal set based on a predetermined position of phase angle at a delay time between consecutive data frames (S200), receiving second wheel phase angle information at the time of transmitting the burst signal, from a wheel monitoring module provided in a vehicle body and measuring rotation of the wheel 10 (S300), and calculating a predetermined position of phase angle (first wheel phase angle information) from the delay time and comparing the calculated phase angle position and the second wheel phase angle information to identify the position of the wheel 10 on which the tire pressure monitoring module 120 is mounted (S400).

In the determining of the position of the wheel 10 on which the tire pressure monitoring module 120 is mounted (S400), the predetermined position of phase angle (first wheel phase angle information) where the respective tire pressure monitoring modules 120 transmits the burst signal is calculated from the burst signal sequentially transmitted from the tire pressure monitoring module 120 and a first phase angle displacement is calculated therefrom, the second phase angle displacement is calculated from the second wheel phase angle information of each wheel 10 when the respective burst signal are transmitted to identify the wheel 10 in which the first phase angle displacement and the second phase angle displacement sequentially coincide with each other as the wheel on which the tire pressure monitoring module 120 is mounted.

In the transmitting of the burst signal (S200), the phase angle of the wheel 10 is partitioned into a plurality of angles and phase angle numbers are assigned to the respective partitioned positions, transmits the burst signal to the control unit 140 through the pressure monitoring transmission unit 123 at a predetermined position among the respective partitioned positions, and the delay time is calculated and applied based on the phase angle number assigned to the position.

In this case, the delay time may be calculated as a value acquired by adding (phase angle number×1 ms) to the reference delay time.

Alternatively, in the transmitting of the burst signal (S200), the phase angle of the wheel 10 is partitioned into a plurality of phase angles and phase angle numbers are assigned to the respective partitioned positions, a plurality of transmission patterns in which the phase angle numbers are arbitrarily arranged is stored, a predetermined transmission pattern among the plurality of stored transmission patterns is selected to calculate and apply the delay time based on transmission pattern information representing a position indicated by the phase angle number according to each of the phase angle numbers arranged in the transmission pattern at the position.

In this case, the delay time may be calculated as a value acquired by adding (transmission pattern information×0.1 ms) to the reference delay time.

Since the operations of the respective steps are the same as those described in the tire pressure monitoring system 100 according to the exemplary embodiment of the present disclosure, the operations will not be described in detail.

As described above, according to the method for performing auto-location of a tire, the direct-scheme tire pressure monitoring system simply identifies the position of the tire pressure monitoring module 120 to automatically allocate the position.

Further, since the position where the tire pressure monitoring module 120 transmits the burst signal is changed every transmission, an error occurrence risk depending on a signal shading area of the tire 20 or the wheel 10 is reduced.

Moreover, since the position to which the tire pressure monitoring module 120 transmits the burst signal is represented by the delay time between the data frames in the burst signal, the data frames may be simplified.

As described above, the exemplary embodiments have been described and illustrated in the drawings and the specification. The exemplary embodiments were chosen and described in order to explain certain principles of the disclosure and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the disclosure are deemed to be covered by the disclosure which is limited only by the claims which follow.

What is claimed is:

1. A tire pressure monitoring system comprising:
a tire pressure monitoring module provided in a wheel or a tire, the tire pressure monitoring module measuring pressure of the tire and a wheel phase angle of the wheel,
transmitting a burst signal comprising consecutive data frames including a tire pressure information and an identification code at a predetermined position of the phase angle, and
setting a delay time between the consecutive data frames of the burst signal based on the predetermined position of the phase angle;
a wheel monitoring sensor provided in a vehicle body, the wheel monitoring sensor measuring rotation of the wheel to provide phase angle information of the wheel; and
a control unit, the control unit receiving the burst signal from the tire pressure monitoring module, receiving the phase angle information of the wheel at the time of transmitting the burst signal from the wheel monitoring sensor, calculating the predetermined position of the phase angle from the delay time, and comparing the calculated predetermined position of the phase angle and the phase angle information of the wheel with each other to identify a position of the wheel on which the tire pressure monitoring module is mounted, wherein the tire pressure monitoring module partitions the phase angle of the wheel into a plurality of phase angles to assign phase angle numbers to respective partitioned positions, stores a plurality of transmission patterns in which the phase angle numbers are randomly arranged, randomly selects a transmission pattern among the plurality of transmission patterns, and calculates and applies the delay time based on transmission pattern information representing a position indicated by the phase angle number at the position according to each of the phase angle numbers arranged in the plurality of transmission patterns, wherein each of the phase angle numbers is generated by using a random variable.

2. The tire pressure monitoring system of claim 1, wherein the control unit further calculates a first phase angle displacement from the burst signal sequentially transmitted from the tire pressure monitoring module, calculates a second phase angle displacement from the phase angle information of each wheel at the time of transmitting the burst signal, identifies a wheel in which the first phase angle displacement and the second phase angle displacement sequentially coincide with each other as the wheel on which the tire pressure monitoring module is mounted, and assigns the identification code transmitted from the tire pressure monitoring module to the wheel.

3. The tire pressure monitoring system of claim 1, wherein:

the tire pressure monitoring module partitions the phase angle of the wheel into a plurality of phase angles to assign phase angle numbers to respective partitioned positions, and calculates and applies the delay time based on the phase angle number assigned to a predetermined position among the respective partitioned positions at the predetermined position.

4. The tire pressure monitoring system of claim 3, wherein the tire pressure monitoring module calculates a value acquired by adding (the phase angle number×1 ms) to a reference delay time as the delay time.

5. The tire pressure monitoring system of claim 1, wherein the tire pressure monitoring module includes:

a pressure monitoring sensor measuring pressure of the tire, a phase angle sensor measuring a phase angle of the wheel, a pressure monitoring transmission unit wirelessly transmitting the burst signal comprised by the consecutive data frames including the pressure value and the identification code of the tire, and a pressure monitoring control unit setting the delay time between the consecutive data frames based on the predetermined position of the phase angle and controlling the pressure monitoring transmission unit so as to transmit the burst signal at the predetermined position of the phase angle of the wheel.

6. The tire pressure monitoring system of claim 5, wherein the phase angle sensor is provided as an acceleration sensor.

7. The tire pressure monitoring system of claim 1, wherein the wheel monitoring sensor is a wheel speed sensor of an anti-lock brake system (ABS).

8. The tire pressure monitoring system of claim 1, wherein the control unit includes:

a tire information processing unit receiving the burst signal from the tire pressure monitoring module and storing the received burst signal, and calculating the predetermined position of the phase angle from the delay time between the data frames, a rotational information processing unit receiving the phase angle information of each wheel from the wheel monitoring sensor and storing and processing the received phase angle information, and a control processing unit comparing the predetermined position of phase angle information calculated by the tire information processing unit and the phase angle information processed by the rotational information processing unit to automatically allocate the position of the tire pressure monitoring module.

9. A method for performing auto-location of a tire, the method comprising:

measuring, by a tire pressure monitoring module provided in a wheel or the tire, pressure of the tire and a wheel phase angle of the wheel;

transmitting, by the tire pressure monitoring module, a burst signal comprising consecutive data frames including a tire pressure information and an identification code at a predetermined position of the phase angle, wherein a delay time between the consecutive data frames of the burst signal is set based on the predetermined position of the phase angle;

receiving phase angle information at the time of transmitting the burst signal from a wheel monitoring sensor provided in a vehicle body and measuring rotation of the wheel; and calculating the predetermined position of the phase angle from the delay time and comparing the calculated predetermined position of the phase angle with the phase angle information to identify a position of the wheel on which the tire pressure monitoring module is mounted, wherein the phase angle of the wheel is partitioned into the plurality of phase angles to assign phase angle number to the respective partitioned positions, a plurality of transmission patterns is stored, in which the phase angle numbers are randomly arranged, a transmission pattern is randomly selected among the plurality of transmission patterns, and the delay time is calculated and applied based on transmission pattern information representing a position indicated by the phase angle number at the position according to each of the phase angle numbers arranged in the plurality of transmission patterns, wherein each of the phase angle numbers is generated by using a random variable.

10. The method of claim 9, wherein the method further comprises:

calculating a first phase angle displacement from the burst signal sequentially transmitted from the tire pressure monitoring module, calculating a second phase angle displacement from the phase angle information of each wheel at the time of transmitting the burst signal, identifying a wheel in which the first phase angle displacement and the second phase angle displacement sequentially coincide with each other as the wheel on which the tire pressure monitoring module is mounted.

11. The method of claim 9, wherein:

the phase angle of the wheel is partitioned into the plurality of phase angles to assign phase angle number to the respective partitioned positions, and the delay time is calculated and applied based on the phase angle number assigned to a predetermined position among the respective partitioned positions at the predetermined position.

12. The method of claim 11, wherein:

a value acquired by adding (the phase angle number×1 ms) to a reference delay time is calculated and applied as the delay time.

* * * * *